(12) United States Patent
Sastry et al.

(10) Patent No.: US 10,142,371 B2
(45) Date of Patent: Nov. 27, 2018

(54) AUTHORIZATION POLICY CUSTOMIZATION AND AUTHORIZATION POLICY LOCKDOWN

(71) Applicant: Oracle International Corporation, Redwood Shores, CA (US)

(72) Inventors: Hari Sastry, San Jose, CA (US); Krishnakumar Sriramadhesikan, Cupertino, CA (US); Vineet Garg, Foster City, CA (US); Sirish V. Vepa, Pune (IN); Srivatsa Manjunath, Fremont, CA (US); Yi Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 14/974,836

(22) Filed: Dec. 18, 2015

(65) Prior Publication Data
US 2016/0315965 A1 Oct. 27, 2016

Related U.S. Application Data

(60) Provisional application No. 62/152,672, filed on Apr. 24, 2015.

(51) Int. Cl.
*H04L 29/06* (2006.01)
(52) U.S. Cl.
CPC ............ *H04L 63/20* (2013.01); *H04L 63/102* (2013.01); *H04L 63/105* (2013.01)
(58) Field of Classification Search
CPC ..... H04L 63/20; H04L 63/102; H04L 63/104; H04L 63/105; H04L 63/10
See application file for complete search history.

(56) References Cited

U.S. PATENT DOCUMENTS

| 6,158,010 A | 12/2000 | Moriconi et al. |
| 7,673,323 B1 | 3/2010 | Moriconi |

(Continued)

FOREIGN PATENT DOCUMENTS

CN 104462982 3/2015

OTHER PUBLICATIONS

U.S. Appl. No. 14/975,208, First Action Interview Pilot Program Pre-Interview Communication dated Jun. 16, 2017, 3 pages.

(Continued)

*Primary Examiner* — Ayoub Alata
(74) *Attorney, Agent, or Firm* — Kilpatrick Townsend & Stockton LLP

(57) ABSTRACT

Application customization enables many different types of customers, from small companies to large multinational enterprises, to use various applications provided by a cloud service provider. To accommodate these customizations, previous systems generally require manual human intervention to identify custom, customized, and cloud service provider authorization policies (also referred to herein as "seed" authorization policies) and to decide how each type of authorization policy should be upgraded. When applications are customized, artifacts that represent those customizations can be created. In some embodiments, the customizations can include new resources or entitlements, and grants to new roles. In addition to new resources, entitlements, and grants, existing resources, entitlements, and grants can be modified and artifacts corresponding to those modifications can be generated. Embodiments of the present invention provide improved techniques for tracking and managing customizations to simplify and automate upgrade processes.

20 Claims, 10 Drawing Sheets

(56) References Cited

U.S. PATENT DOCUMENTS

| | | |
|---|---|---|
| 9,471,798 B2 | 10/2016 | Vepa et al. |
| 2002/0059471 A1 | 5/2002 | Sanghvi et al. |
| 2002/0169974 A1 | 11/2002 | Mckune |
| 2002/0188568 A1 | 12/2002 | Nickolaisen et al. |
| 2003/0081621 A1* | 5/2003 | Godfrey ............... H04L 29/06 370/400 |
| 2003/0115322 A1 | 6/2003 | Moriconi et al. |
| 2004/0107360 A1 | 6/2004 | Herrmann et al. |
| 2005/0273600 A1 | 5/2005 | Seeman |
| 2006/0265758 A1 | 11/2006 | Khandelwal et al. |
| 2007/0143148 A1 | 6/2007 | Kol et al. |
| 2009/0325566 A1 | 12/2009 | Bell et al. |
| 2011/0131275 A1 | 6/2011 | Maida-Smith et al. |
| 2012/0036370 A1 | 2/2012 | Lim et al. |
| 2012/0131164 A1 | 5/2012 | Bryan et al. |
| 2012/0198041 A1 | 8/2012 | Black et al. |
| 2012/0260303 A1 | 10/2012 | Wollnik et al. |
| 2013/0086626 A1 | 4/2013 | Kavantzas et al. |
| 2013/0174216 A1 | 7/2013 | Simske et al. |
| 2013/0232540 A1 | 9/2013 | Saidi et al. |
| 2014/0032691 A1* | 1/2014 | Barton .................. H04L 41/00 709/206 |
| 2014/0109176 A1 | 4/2014 | Barton et al. |
| 2014/0173700 A1 | 6/2014 | Awan et al. |
| 2014/0189777 A1 | 7/2014 | Viswanathan et al. |
| 2015/0089575 A1 | 3/2015 | Vepa et al. |
| 2015/0172321 A1 | 6/2015 | Kirti et al. |
| 2016/0232374 A1 | 8/2016 | Huang et al. |
| 2016/0315926 A1 | 10/2016 | Agarwal et al. |
| 2016/0315943 A1 | 10/2016 | Manjunath et al. |
| 2017/0004312 A1 | 1/2017 | Agarwal et al. |
| 2017/0004313 A1 | 1/2017 | Agarwal et al. |
| 2017/0006064 A1 | 1/2017 | Agarwal et al. |
| 2017/0019408 A1 | 1/2017 | Vepa et al. |
| 2017/0078721 A1 | 3/2017 | Brockmann et al. |
| 2017/0147825 A1 | 5/2017 | Barton et al. |

OTHER PUBLICATIONS

U.S. Appl. No. 14/484,050, Non-Final Office Action dated Jan. 4, 2016, 14 pages.
U.S. Appl. No. 14/484,050, Notice of Allowance dated Jun. 2, 2016, 8 pages.
U.S. Appl. No. 15/278,902, Non-Final Office Action dated Aug. 31, 2017, 19 pages.
U.S. Appl. No. 15/136,734, First Action Interview Office Action Summary dated May 1, 2018, 7 pages.
U.S. Appl. No. 15/197,463, Applicant Initiated Interview Summary dated May 11, 2018, 3 pages.
U.S. Appl. No. 15/197,478, Applicant Initiated Interview Summary dated May 11, 2018, 3 pages.
U.S. Appl. No. 15/278,902, Final Office Action dated Apr. 20, 2018, 21 pages.
U.S. Appl. No. 15/197,472, First Action Interview Office Action Summary dated May 21, 2018, 4 pages.
U.S. Appl. No. 14/975,208, First Action Interview Pilot Program Pre-Interview Communication dated Dec. 15, 2017, 5 pages.
U.S. Appl. No. 15/136,734, First Action Interview Pilot Program Pre-Interview Communication dated Mar. 5, 2018, 7 pages.
U.S. Appl. No. 15/197,463, Non-Final Office Action dated Feb. 9, 2018, 22 pages.
U.S. Appl. No. 15/197,478, Non-Final Office Action dated Feb. 7, 2018, 21 pages.

* cited by examiner

AUTHORIZATION POLICY CUSTOMIZATION AND AUTHORIZATION POLICY LOCKDOWN

CROSS-REFERENCES TO RELATED APPLICATIONS

This application is a non-provisional application and claims the benefit and priority of U.S. Provisional Application No. 62/152,672, filed on Apr. 24, 2015, entitled "AUTHORIZATION POLICY CUSTOMIZATION AND AUTHORIZATION POLICY LOCKDOWN," which is herein incorporated by reference in its entirety for all purposes.

BACKGROUND

The present disclosure relates generally to computer systems and software, and more particularly to techniques for authorization policy customization and authorization policy lockdown.

Cloud-based enterprise technologies enable companies to access and use various different enterprise-level applications without requiring a significant on-site infrastructure. Instead, these enterprise-level applications can be accessed as cloud services, from typical client devices such as desktop, laptop, and mobile devices. This allows many different sized companies to use these applications, beyond those companies that can support large on-premise infrastructure. Standard cloud services from a cloud services provider can be customized to meet the particular needs of a given enterprise. However, these customer-specific customizations can lead to complications when cloud services are upgraded, or otherwise modified, by the cloud services provider.

Currently, application upgrade procedures for on-premise, on-demand, or cloud-based are performed manually to account for individual authorization policy customizations made for each customer. This adds significant complexity to the upgrade process, and leads to longer down times.

SUMMARY

In certain embodiments, techniques are provided e.g., a method, a system, non-transitory computer-readable medium storing code or instructions executable by one or more processors) to automate upgrade procedures by providing improved management customizations. Application customization enables many different types of customers, from small companies to large multinational enterprises, to use various applications provided by a cloud service provider. To accommodate these customizations, previous systems generally require manual human intervention to identify custom, customized, and cloud service provider authorization policies (also referred to herein as "seed" authorization policies) and to decide how each type of authorization policy should be upgraded. When applications are customized, artifacts that represent those customizations can be created. In some embodiments, the customizations can include new resources or entitlements, and grants to new roles. In addition to new resources, entitlements, and grants, existing resources, entitlements, and grants can be modified and artifacts corresponding to those modifications can be generated. Embodiments of the present invention provide improved techniques for tracking and managing customizations to simplify and automate upgrade processes.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments, techniques are provided (e.g., a method, a system, non-transitory computer-readable medium storing code or instructions executable by one or more processors) to automate upgrade procedures by providing improved management customizations. Application customization enables many different types of customers, from small companies to large multinational enterprises, to use various applications provided by a cloud service provider. To accommodate these customizations, previous systems generally require manual human intervention to identify custom, customized, and cloud service provider authorization policies (also referred to herein as "seed" authorization policies) and to decide how each type of authorization policy should be upgraded. When applications are customized, artifacts that represent those customizations can be created. In some embodiments, the customizations can include new resources or entitlements, and grants to new roles. In addition to new resources, entitlements, and grants, existing resources, entitlements, and grants can be modified and artifacts corresponding to those modifications can be generated. Embodiments of the present invention provide improved techniques for tracking and managing customizations to simplify and automate upgrade processes.

Figure 1:
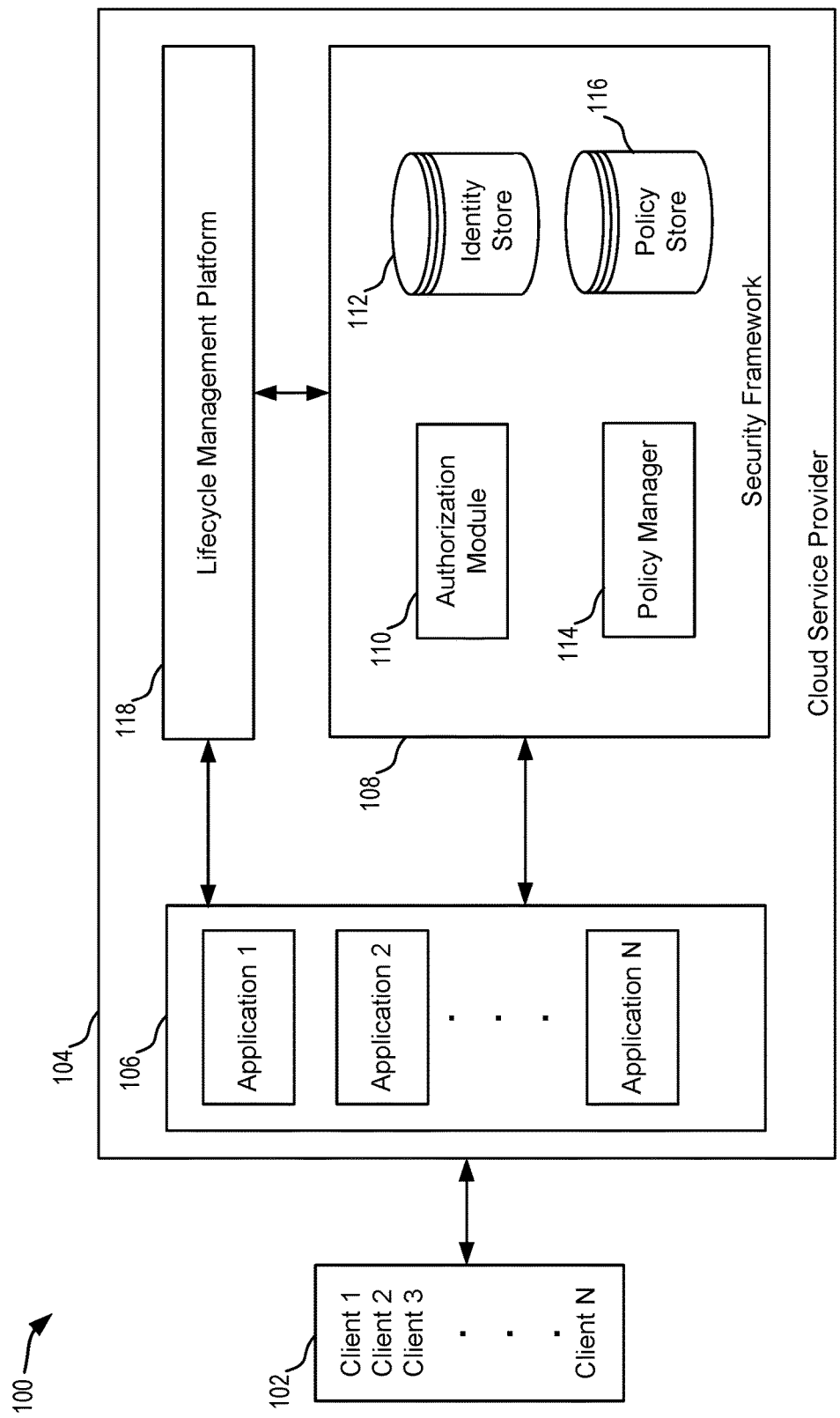
FIG. 1 illustrates an example of a system that provides authorization policy customization, in accordance with an embodiment of the present invention.

FIG. 1 illustrates an example of a system 100 that provides authorization policy customization, in accordance with an embodiment of the present invention. As shown in FIG. 1, system 100 may include one or more client devices (collectively, client devices 102) communicatively coupled to a cloud service provider 104. Cloud service provider 104 can provide one or more applications (collectively, applications 106) which may be accessed by clients 102 via a communication network. Examples of applications 106 can include various cloud-based applications and services such as software as a service (SaaS) applications, platform as a service (PaaS) platforms, and infrastructure as a service (IaaS) resources. A given company (e.g., associated with a subset of client devices 102) may subscribe to one or more applications 106 or services provided by cloud service provider 104 and customize those applications 106 or services to meet the particular needs of the company. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. The communication network facilitates communications between client devices 102 and cloud service provider 104. The communication network can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network may include any communication network or infrastructure that facilitates communications between clients 102 and cloud service provider 104.

In some embodiments, applications 106 can be subscribed to by a customer and customized to meet that customer's needs. For example, each customer may have their own organizational hierarchy used to organize the customer's employees. The particular actions available to different users may be controlled by access policies associated with the organizational hierarchy. Since each customer's organizational hierarchy may be different, applications 106 can be tailored to provide the appropriate actions to the appropriate users according to custom, or customized authorization policies. Such customizations can be managed by a security framework 108. Security framework 108 can include an authorization module 110, which can determine access to resources based on user identity information maintained in identity store 112 and authorization policy data maintained in authorization policy store 116. Identity store 112 can maintain enterprise users and enterprise roles. Examples of an identity store 112 can include Oracle Internet Directory, Active Directory, etc. Authorization policy Store 116 can be a repository including application-specific rules and policies. Examples of an authorization policy store can include Oracle Internet Directory, policy-store.xml, DB, etc. An authorization policy manager 114 can enable customers to add custom authorization policies and/or customize existing authorization policies within authorization policy store 116.

In some embodiments, when an application 106 is accessed by a client device 102, authorization module 110 can identify the requestor (e.g., using identity information included with the request and identity store 118) and apply authorization policies (e.g., stored in authorization policy store 116) to the request. The authorization policies can include roles, which define actions that can be performed by particular users. The roles can be mapped from the authorization policy store to the customer's organization hierarchy maintained in the identity store. Authorization policies may also define user permissions, resource access, and entitlements. Authorization policies can be defined on a per user and/or per application basis.

Although application customization enables many different customers to use various applications provided by cloud service provider 104, management of these customizations during upgrades and other lifecycle management operations can be challenging. For example, previous systems generally require manual human intervention to identify custom, customized, and cloud service provider authorization policies (also referred to herein as "seed" authorization policies) and to decide how each type of authorization policy should be upgraded. This can lead to significant down time, as each application is upgraded.

Embodiments of the present invention can identify and tag authorization policy objects, identify an authorization policy owner, and can control how different authorization policy objects can be modified by customers. For example, custom authorization policies can include authorization policies created and owned by customers. Custom authorization policies can be modified as needed by the customer and/or based on a modification policy defined by the customer. Seed authorization policies, defined and owned by the cloud service provider 104 can include modifiable and non-modifiable seed authorization policies. Each seed authorization policy can be associated with a modification policy defined by cloud service provider 104. The modification policy can control the types of changes allowed on authorization policy objects received from the service provider. By defining an owner for each authorization policy and a modification policy for each authorization policy, the application upgrade process can be simplified and automated.

Embodiments of the present invention address these problems and others using an improved security framework. In some embodiments, authorization policy information is enhanced to include additional authorization policy metadata for tagging authorization policy objects as seed authorization policy data or as the custom authorization policy data. In some embodiments, authorization policy metadata can be managed for authorization policy objects through an authorization policy management API. Lifecycle management (LCM) platform 118 can provide various LCM tools, such as a policy migration tool and a patching tool, to perform upgrades and other management operations on authorization policies maintained in authorization policy store 116. In some embodiments LCM platform 118 can manage authorization policies using the authorization policy management API (e.g., through authorization policy manager 114). In some embodiments, the security framework can identify different types of authorization policy objects using metadata associated with the authorization policy objects. For example, the authorization policy objects can include seed authorization policy objects provided by the cloud service provider and/or application provider) and non-seed authorization policy objects (defined by the customer). The security framework 108 can also define how applications can define and package changes to the authorization policy objects during upgrades. In some embodiments, upgrades to authorization policy objects can be divided into three files, each representing changes made to the authorization policy objects that represent authorization policy additions, authorization policy modifications and authorization policy deletions. In some embodiments, an authorization policy XML schema can be provided which enables changes to the authorization policies to be tagged, where the tags indicate an authorization policy operation (e.g., add, modify and delete) associated with the change.

Figure 2:
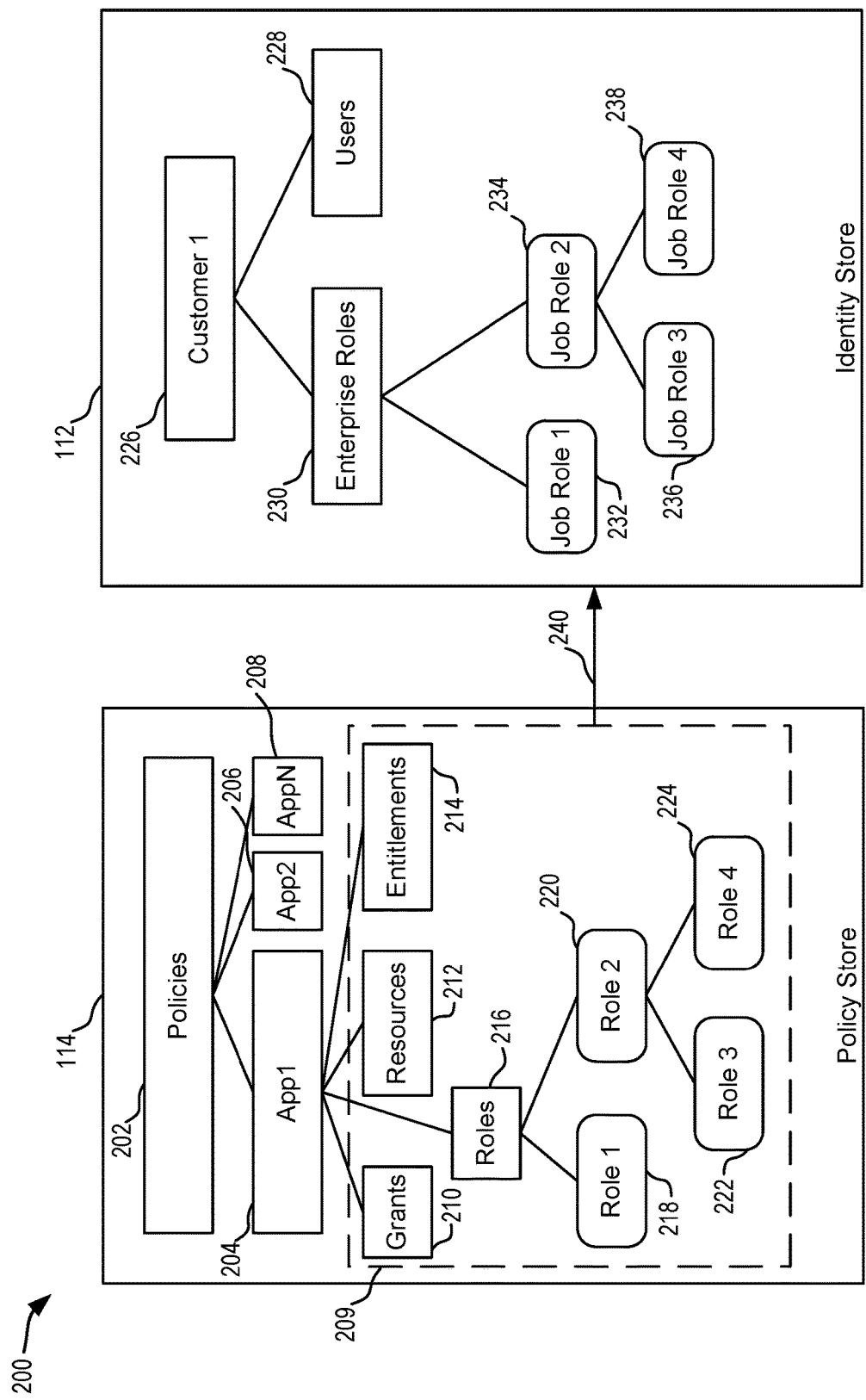
FIG. 2 shows an example of an authorization policy store and identity store mapping, in accordance with an embodiment of the present invention.

FIG. 2 shows an example of an authorization policy store and identity store mapping 200, in accordance with an embodiment of the present invention. Applications 106 can be customized by customers to fit the customer's particular needs. Such customizations can be effected, e.g., at the business level, using an integrated development environment or other customization tool. This enables business users, who may have limited software development skills to customize and personalize applications to suit their business needs. When applications are customized, artifacts that represent those customizations can be created. In some embodiments, the customizations can include new resources or entitlements, and grants to new roles. In addition to new resources, entitlements, and grants, existing resources, entitlements, and grants can be modified and artifacts corresponding to those modifications can be generated. In either case, the artifacts corresponding to new resources can be represented by new artifacts distinct from the seed artifacts.

In some embodiments, roles 216 can be application-specific roles defined by the cloud service provider, application provider, or other entity. The application can use the roles to determine, e.g., access rights, modification rights, or other security features of actions performed by users in the application. Enterprise Roles 230 can include roles defined by a customer which may correspond to business policies specific to that customer's organizational structure.

As shown in FIG. 2, authorization policies 202 for various applications 204, 206, 208 provided by a cloud services provider can be maintained in authorization policy store 114. Each application can be associated with application specific artifacts 209 that represent grants 210, resources 212, entitlements 214, and roles 216. As shown in FIG. 2, roles 216 can include various default roles 218, 220, 222, 224. In the example shown in FIG. 2, the artifacts 209 can be "seed" artifacts provided by the application 204, cloud services provider, vendor, or other entity (other than the customer). When a customer 226 subscribes to a particular cloud service, such as application 1 204, the user can map 240 the seed roles 216 to the customer's particular organization structure, represented here as enterprise roles 230 and users 228. Each seed role 218, 220, 222, 224 can be mapped to each enterprise role 232, 234, 236, 238. However, different customers may be organized differently such that the seed roles provided by the cloud service provider do not clearly map to the enterprise roles. To accommodate customer-specific differences, the authorization policies 202 can be customized b r the customer (or new authorization policies may be added). These customizations may then be represented by new, or customized, artifacts, as discussed further below.

Figure 3:
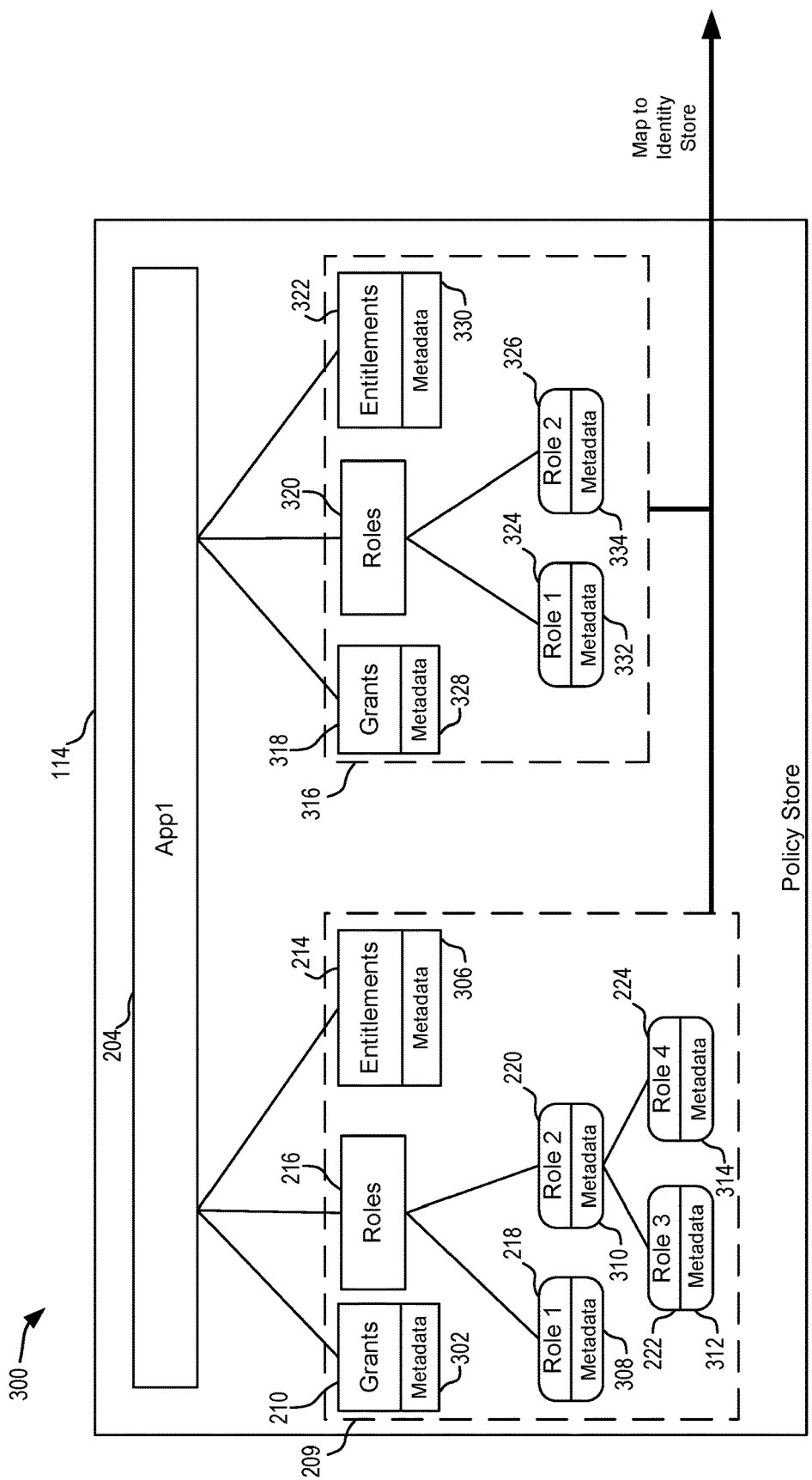
FIG. 3 shows an example of adding metadata to authorization policies in an authorization policy store, in accordance with an embodiment of the present invention.

FIG. 3 shows an example 300 of adding metadata to authorization policies in an authorization policy store, in accordance with an embodiment of the present invention. As shown in FIG. 3, customers can customize the default (e.g., seed) authorization policies provided by the cloud service provider. This can include, e.g., removing existing actions on resources in an entitlement, adding or removing existing resources from an entitlement, changing the duty role an entitlement is granted to, changing the duty role hierarchy (e.g., add or remove roles), and/or changing the membership of duty (app) role to an enterprise role (job).

In some embodiments, any customizations made by the customer can be made by adding new authorization policies, and new corresponding artifacts 316, to authorization policy 114. Each artifact, including seed artifacts 209 and new artifacts 316 can be augmented with metadata which defines an owner of the artifact. Metadata attributes can be added according to an authorization policy information model. The authorization policy information model can include key-value pairs. For example, an authorization policy information model can include a Policy Object Owner (which specifies the owner of the object), a Policy Object Initial Version (which specifies the initial version of the Object), a Policy Object Modifier (indicating the identity of the entity who last modified the object), a Policy Object Customized (indicating on-going customizations), a Policy Object Current Version (indicating the current version of the object), and a Policy Object Soft Delete (indicating whether the object has been marked for deletion). In some embodiments, the owner can represent the entity that created the artifact and can map to a customization policy associated with the artifact. For example, as shown in FIG. 3, each seed artifact 209 can be augmented with metadata 302-314 which indicates an owner of "Cloud Service Provider". The metadata 302-314 can be associated with a customization policy that prevents changes made by any entity other than the cloud service provider. Similarly, each custom artifact 316, including artifacts 318-326, can be augmented to include metadata 328-334 which identifies "Customer" as the owner. Additionally, the customer can specify a customization policy that prevents changes to be made to the custom artifacts 316 by any entity other than the customer. In some embodiments, the metadata tags (also referred to herein as metadata extensions) can include various details such as the owner of the authorization policy, a version identifier, customization history, and other information.

This metadata tagging of the artifacts enables upgrade processes to easily differentiate between seed artifacts and customer artifacts. Additionally, the customization policies can be tailored to control how, and by whom, the artifacts can be modified. This can be used to simplify upgrade procedures by automatically upgrading any authorization policies owned by the cloud service provider. Additionally, by limiting customizations according to the customization policies, a rules-based lifecycle management platform can be provided to manage authorization policy lifecycles (including upgrade processes) to limit manual intervention required during lifecycle management. In some embodiments, customization policies may be used to prevent changes to a particular artifact (e.g., to lockdown the artifact).

In some embodiments, authorization policy manager 114 can expose management interfaces, such as application programming interfaces, messaging application programming interfaces, or other interfaces, through which authorization policies can be accessed, modified, added, and deleted. In some embodiments, lifecycle management (LCM) tools can use the management interfaces to identify each authorization policy and corresponding artifact or artifacts, determine one or more updates to be applied to the authorization policies based on the associated metadata, and apply the one or more updates to the authorization policies in the authorization store. In some embodiments, the LCM tools can include an authorization policy migration tool that is configured to tag authorization policies with migration metadata, which can include a set of metadata values for authorization policy data being migrated, such as during a release or patch. In some embodiments, the LCM tools can include an authorization policy patching tool which can query the authorization policy store, using the management interfaces, to identify authorization policy artifacts associated with customer changes (e.g., new authorization policy artifacts and customized authorization policy artifacts associated with seed authorization policies). The authorization policy patching tool can determine a "delta policy update" representing the difference between the current authorization policy configuration and an updated authorization policy configuration to be applied to the authorization policy store.

Figure 4:
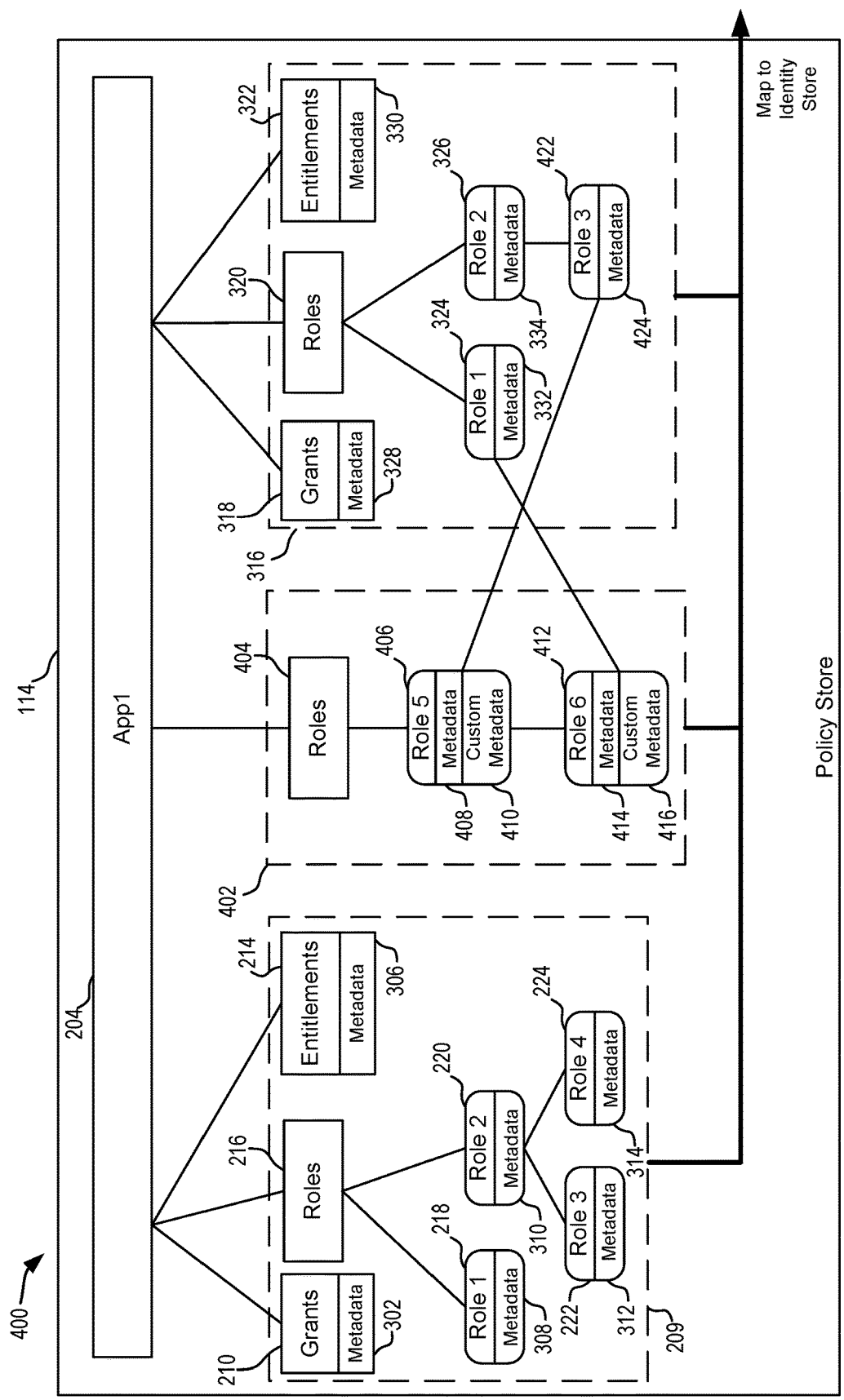
FIG. 4 shows a first example of customizing authorization policies in an authorization policy store, in accordance with an embodiment of the present invention.

FIG. 4 shows a first example 400 of customizing authorization policies in an authorization policy store, in accordance with an embodiment of the present invention. As shown in FIG. 4, in addition to adding new authorization policies 316, a subset of modifiable seed authorization policies 402 may be provided by the cloud service provider. As described above, seed artifacts 209 can be associated with a customization policy that limits their customization to the cloud service provider. This can simplify the upgrade process by eliminating potential conflicts introduced by user customizations. Similarly, new artifacts 316 can be added for new authorization policies provided by the user. Additionally, the cloud service provider can include customizable seed authorization policies 402. In the example of FIG. 4, customizable roles 404 include role 5 406 and role 6 412. Each customizable role includes metadata 408, 414 indicating, e.g., customizability, a link to a customization policy, ownership, version, etc. In addition, each customizable role can include custom metadata 410, 416 provided by the customer. The custom metadata 410, 416 can represent authorization policy changes provided by the customer, such as modified role relationships relative to new roles 324 and 422.

Figure 5:
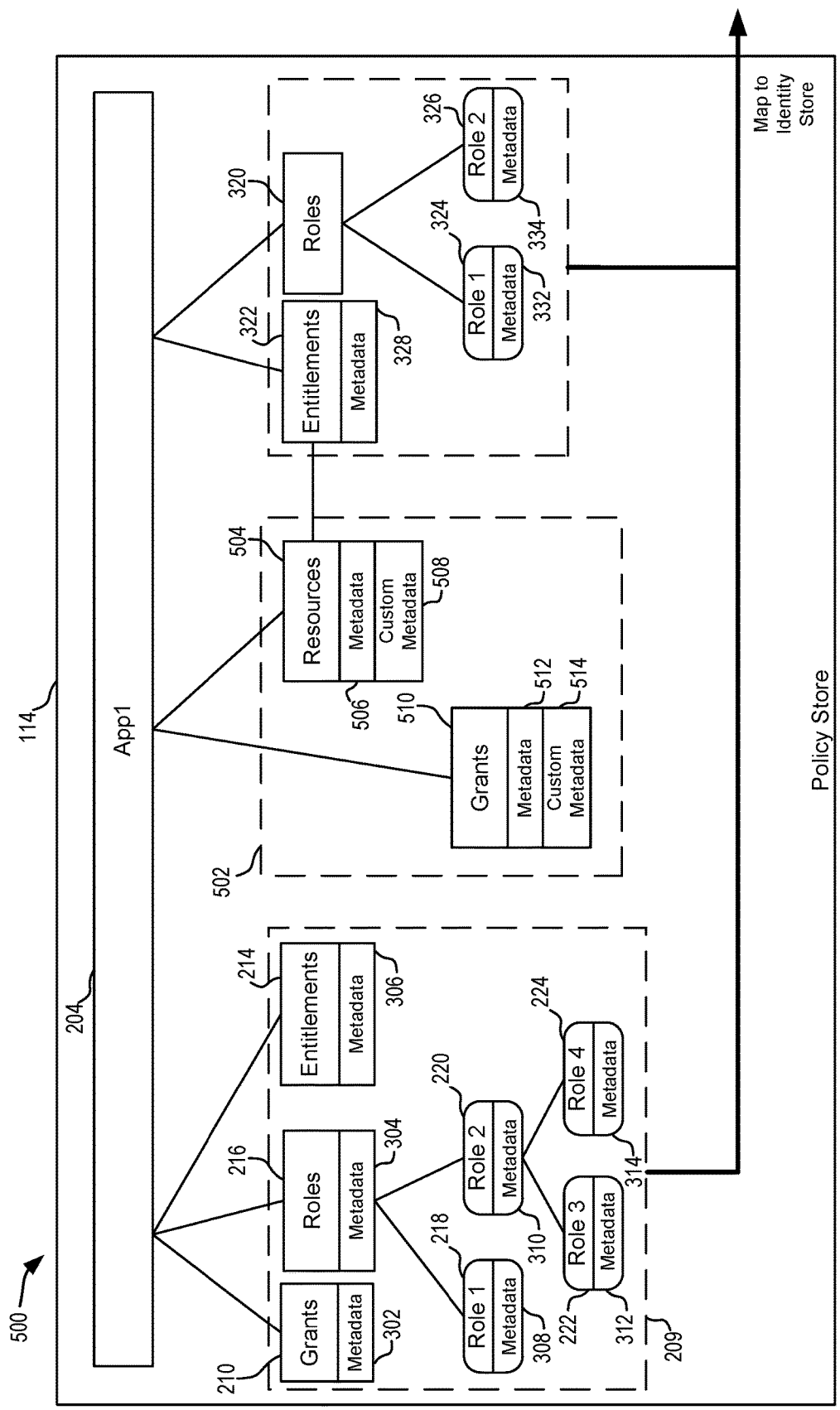
FIG. 5 shows a second example of customizing authorization policies in an authorization policy store, in accordance with an embodiment of the present invention.

FIG. 5 shows a second example 500 of customizing authorization policies in an authorization policy store, in accordance with an embodiment of the present invention. In addition to the customizable roles shown above with respect to FIG. 4, customizable authorization policies 502 can include resources 504 and grants 510. Each customizable artifact can include seed metadata 506, 512 and custom metadata 508, 514 corresponding to changes made by the customer. In the example shown in FIG. 5, new entitlements 322 have been added by the customer and linked to customizable resources 504.

Figure 6:
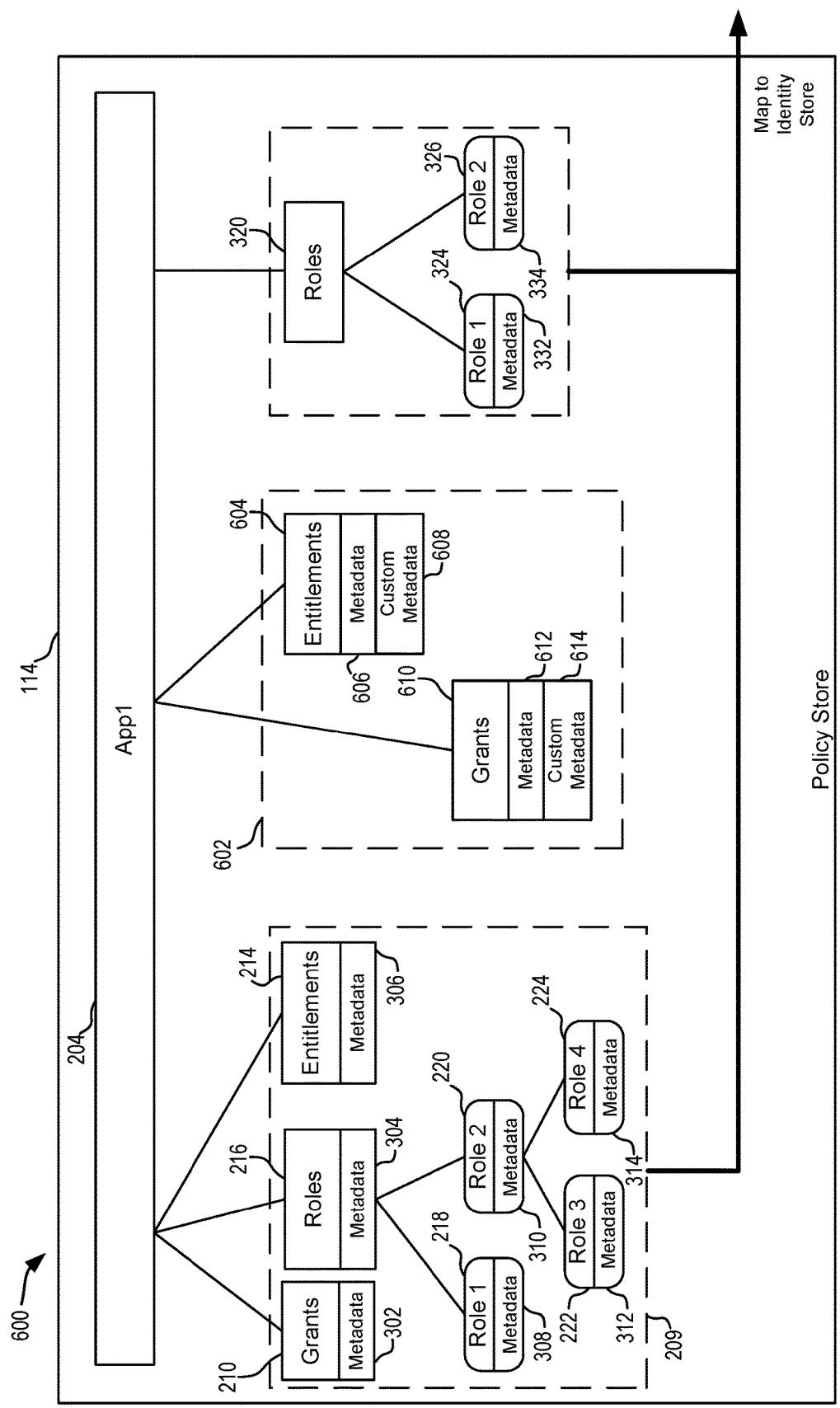
FIG. 6 shows a third example of customizing authorization policies in an authorization policy store, in accordance with an embodiment of the present invention.

FIG. 6 shows a third example 600 of customizing authorization policies in an authorization policy store, in accordance with an embodiment of the present invention. As shown in FIG. 6, the customer can provide new roles 320. Customizable authorization policies 602 can include entitlements 604 and grants 610. These can include seed metadata 606, 612 that cannot be modified by entities other than the cloud service provider, and customizable metadata 608, 614 that the customer may modify. Customization policies can define how the customizable metadata 608, 614 can be modified by the customer. As described above, by limiting the types of modifications that the customer can make, the upgrade process can be simplified.

In some embodiments, seed authorization policy data can be provisioned for a particular deployment through an initial authorization policy migration. During provisioning, the initial authorization policy data can be tagged with metadata indicating that the authorization policy data is "seed" authorization policy data as it is added to the authorization policy store.

In some embodiments, an update framework can be provided which is configured to add metadata to authorization policy artifacts in preexisting deployments, where metadata tagging was not previously supported. For example, a data messaging tool can compare baseline authorization policies with production authorization policies to identify user changes; tag all of the authorization policies to differentiate between user and cloud provider authorization policies. In older systems, where metadata may not be supported by the legacy data store, the metadata can be stored in a separate file or data store. Alternatively, after the baseline and production have been compared, the updated artifacts can be tagged as seed artifacts. The customers changes can be compared to the updated artifacts and any violations can be manually reconciled. Alternatively, violations can be automatically rejected and logged, enabling users to later view the changes made.

In some embodiments, a Policy Migration tool can be used for migrating authorization policy data from one repository to another. The authorization policy migration tool can be used to seed authorization policy data. Different lifecycle tools can invoke the authorization policy migration tool to seed authorization policy data. These lifecycle tools can include a deployment listener which may be invoked when an application is deployed. In some embodiments, the authorization policy migration tool can be used to migrate authorization policies to a runtime authorization policy store at deployment. The lifecycle tools can also include a Life Cycle Management tool which can invoke the authorization policy migration tool during domain configuration, extension, and/or reconfiguration to seed authorization policy data.

In some embodiments, the authorization policy migration tool can be used while migrating configurations from test to production environments, production to test environments, production to staging environment etc. The authorization policy metadata can be migrated as is.

In some embodiments, the migration tool can read metadata information from a source data store and migrate the metadata along with authorization policy store artifacts. In some embodiments, the migration tool can read metadata from an external properties file and apply the metadata to all artifacts migrated by the migration tool. If metadata is not supplied through a source authorization policy store or external file, metadata should not be migrated. In some embodiments, metadata of existing artifacts is not modified or deleted during migration.

In some embodiments, a migration tool can be enhanced to allow for metadata to be provided from external sources some embodiments, migration APIs can be provided which are configured to receive metadata externally. Migration tool interfaces can be extensible, such that switches and parameters can be set and new switch or configuration parameters can be specified without requiring changes to method signatures. In some embodiments, a parameter may be received through the migration APIs which indicates a name and location of external metadata. In some embodiments, scripts (such as WSLT scripts) can be modified to receive metadata externally.

Figure 7:
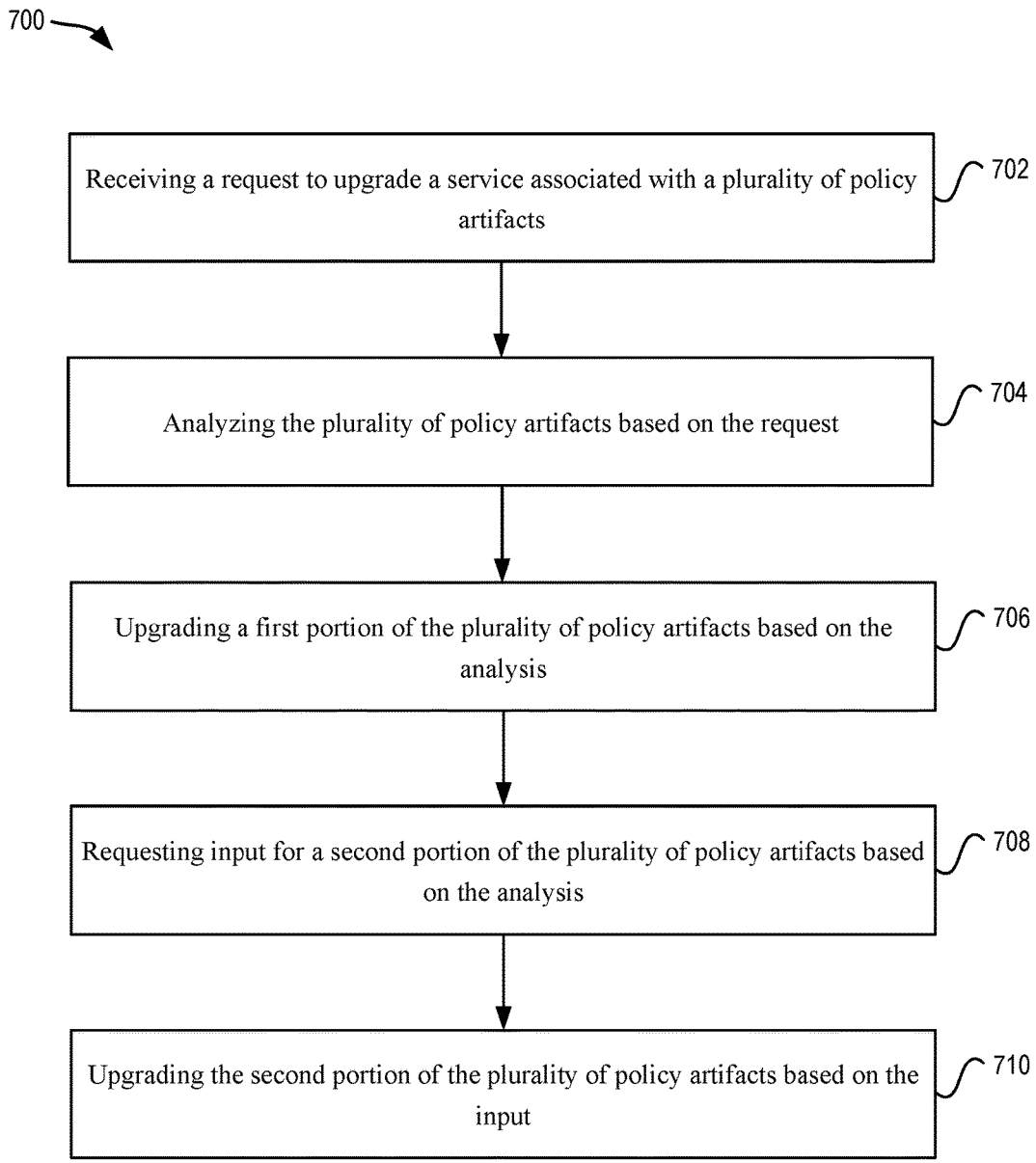
FIG. 7 shows a method of upgrading authorization policies using metadata associated with authorization policy artifacts, in accordance with an embodiment of the present invention.

FIG. 7 shows a method 700 of upgrading authorization policies using metadata associated with authorization policy artifacts, in accordance with an embodiment of the present invention. At block 702, a request to upgrade a service associated with a plurality of authorization policy artifacts can be received. In some embodiments, the request can be received from an administrative computer, or cluster, within a cloud services environment. In some embodiments, each authorization policy artifact is associated with metadata including an owner name and a modifiability flag. The modifiability flag can be associated with a modification policy (also referred to herein as a customization policy) that defines how the authorization policy artifact is modifiable.

At block 704, the plurality of authorization policy artifacts can be analyzed based on the request. For example, in some embodiments, analyzing the plurality of authorization policy artifacts based on the request, can include identifying a first subset of the plurality of authorization policy artifacts and a second subset of the plurality of authorization policy artifacts based on the associated metadata. For example, the first subset can include authorization policy artifacts owned by a service provider, and the second subset can include authorization policy artifacts that are modifiable. In some embodiments, each authorization policy artifact owned by the service provider (e.g., in the first subset of the plurality of authorization policy artifacts) is non-modifiable. This can be indicated, e.g., through the absence of a modifiability flag, by the modifiability flag being set to false, and/or by a customization policy associated with the modifiability flag indicating that the authorization policy artifact is not modifiable. In some embodiments, the analysis can include identifying one or more user modifications made to the plurality of authorization policy artifacts.

At block 706, the first subset of the plurality of authorization policy artifacts can be upgraded based on the analysis. For example, the service provider owner of each authorization policy artifact in the first subset of the plurality of authorization policy artifacts can upgrade, delete, replace, patch or otherwise modify the authorization policy artifacts.

At block 708, input can be requested for the second subset of the plurality of authorization policy artifacts based on the analysis. For example, the input can include upgrade instructions for each authorization policy artifact in the second subset of the plurality of authorization policy artifacts. This can limit the required manual intervention during the upgrade process to only those authorization policy artifacts in the second subset. At block 710, the second subset of the plurality of authorization policy artifacts can be upgraded based on the input.

Figure 8:
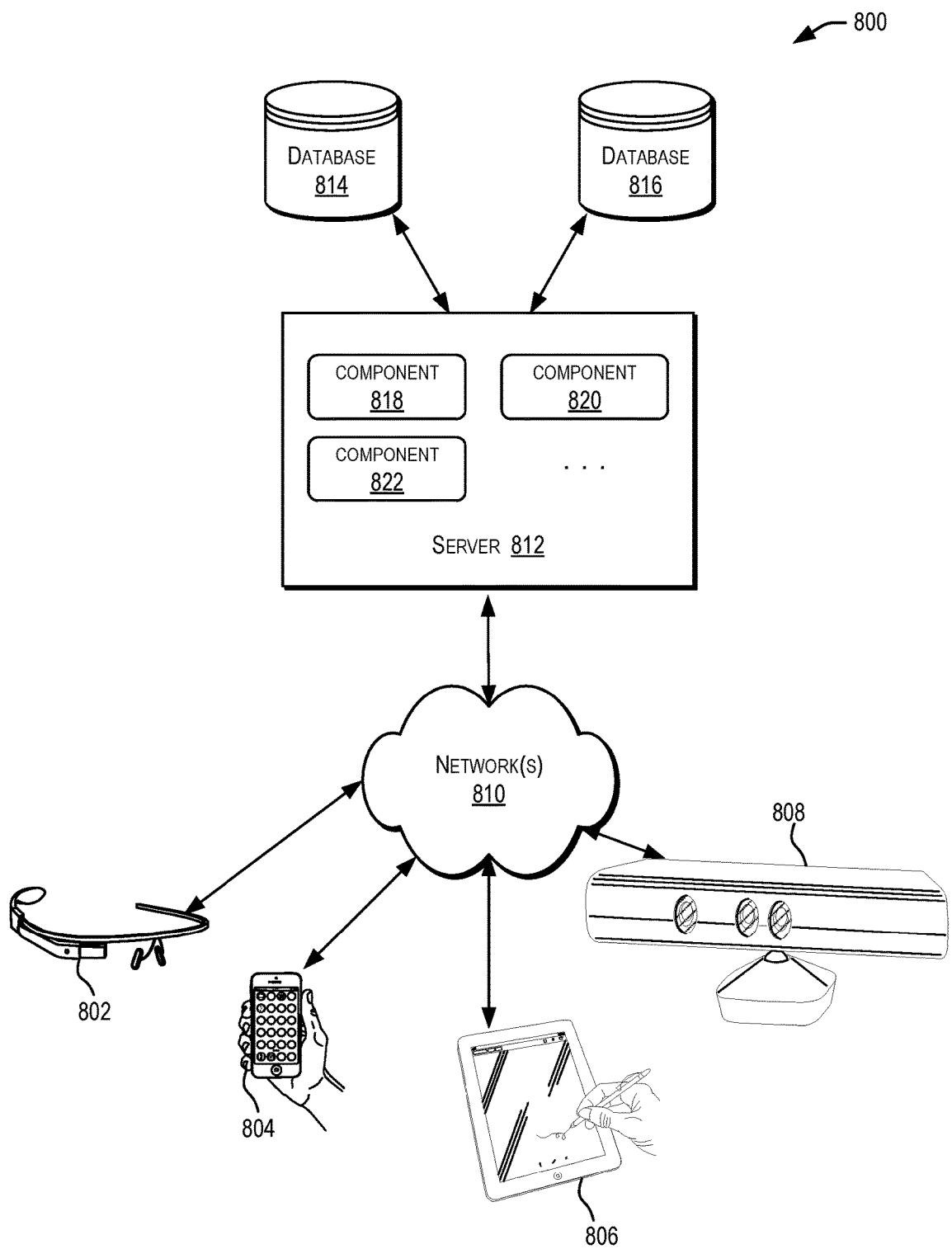
FIG. 8 depicts a simplified diagram of a distributed system for implementing an embodiment of the present invention.

FIG. 8 depicts a simplified diagram of a distributed system 800 for implementing an embodiment of the present disclosure. In the illustrated embodiment, the distributed system 800 includes one or more client computing devices 802, 804, 806, and 808, which are configured to execute and operate a client application such as a web browser, proprietary client (e.g., Oracle Forms), or the like over one or more network(s) 810. The server 812 may be communicatively coupled with the remote client computing devices 802, 804, 806, and 808 via network 810.

In various embodiments, the server 812 may be adapted to run one or more services or software applications such as services and applications that provide storage management services and identity management services. In certain embodiments, the server 812 may also provide other services or software applications can include non-virtual and virtual environments. In some embodiments, these services may be offered as web-based or cloud services or under a Software as a Service (SaaS) model to the users of the client computing devices 802, 804, 806, and/or 808. Users operating the client computing devices 802, 804, 806, and/or 808 may in turn utilize one or more client applications to interact with the server 812 to utilize the services provided by these components.

Figure 10:
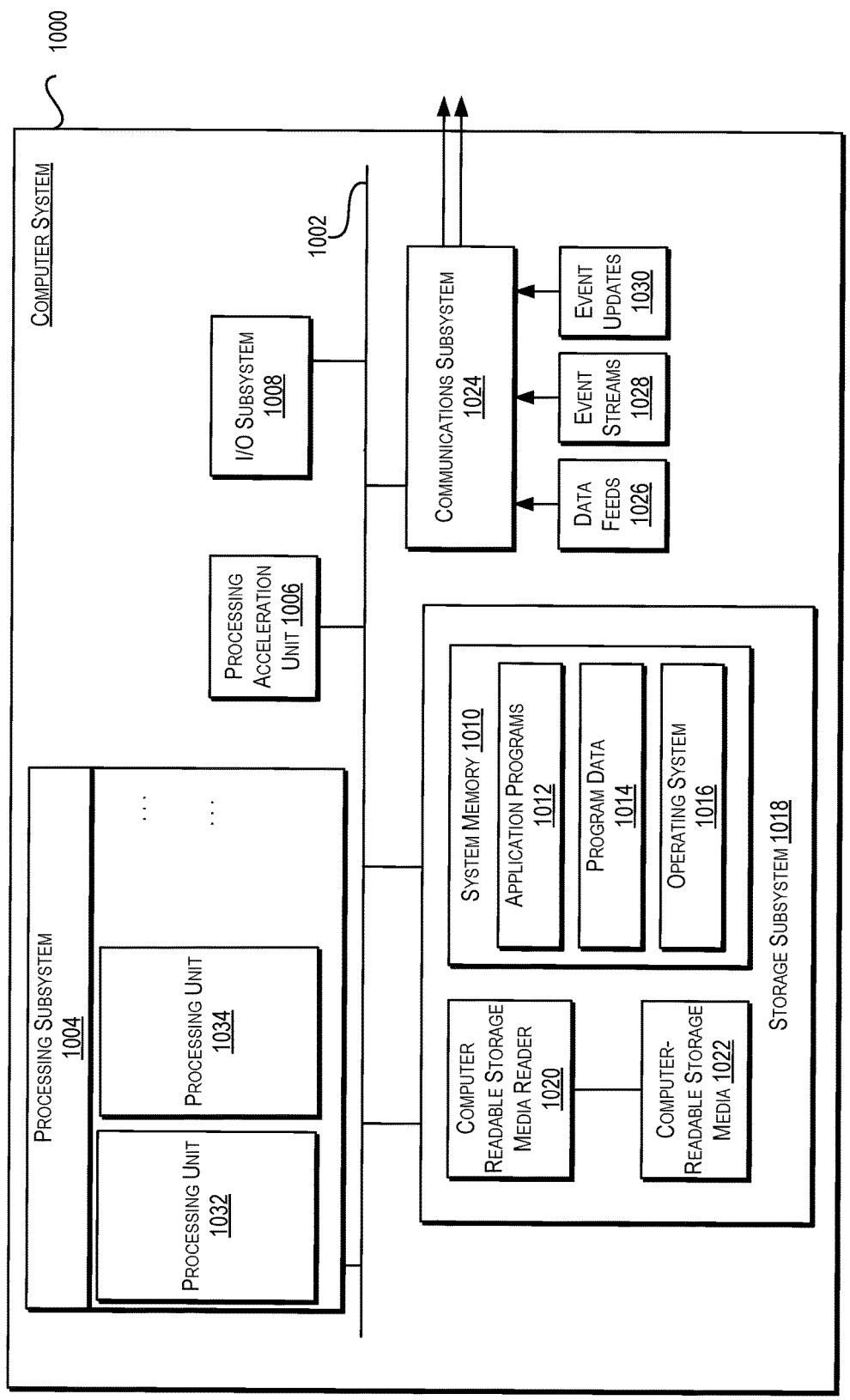
FIG. 10 illustrates an exemplary computer system that may be used to implement an embodiment of the present invention.

In the configuration depicted in FIG. 8, the software components 818, 820 and 822 of system 800 are shown as being implemented on the server 812. In other embodiments, one or more of the components of the system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 10 is thus one example of a distributed system for implementing an embodiment system and is not intended to be limiting.

The client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running van versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 810.

Although distributed system 800 in FIG. 8 is shown with four client computing devices, any number of client computing devices may be supported. Other devices, such as devices with sensors, etc., may interact with the server 812.

The network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization. One or more flexible pools of logical storage devices can be virtualized to maintain virtual storage devices for the server. Virtual networks can be controlled by the server 812 using software defined networking. In various embodiments, the server 812 may be adapted to run one or more services or software applications described in the foregoing disclosure. For example, the server 812 may correspond to a server for performing processing as described above according to an embodiment of the present disclosure.

The server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, (International Business Machines), and the like.

In some implementations, the server 812 may include one or more applications to analyze and consolidate data feeds and/or event updates received from users of the client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 812 may also include one or more applications to display the data feeds and/or real-time events via one or more display devices of the client computing devices 802, 804, 806, and 808.

The distributed system 800 may also include one or more databases 814 and 816. These databases may provide a mechanism for storing information such as user identity information, and other information used by embodiments of the present invention. Databases 814 and 816 may reside in a variety of locations. By way of example, one or more of databases 814 and 816 may reside on a non-transitory storage medium local to (and/or resident in) the server 812. Alternatively, the databases 814 and 816 may be remote from the server 812 and in communication with the server 812 via a network-based or dedicated connection. In one set of embodiments, the databases 814 and 816 may reside in a storage-area network (SAN). Similarly, any necessary files for performing the functions attributed to the server 812 may be stored locally on the server 812 and/or remotely, as appropriate. In one set of embodiments, the databases 814 and 816 may include relational databases, such as databases provided by Oracle, that are adapted to store, update, and retrieve data in response to SQL-formatted commands.

Figure 9:
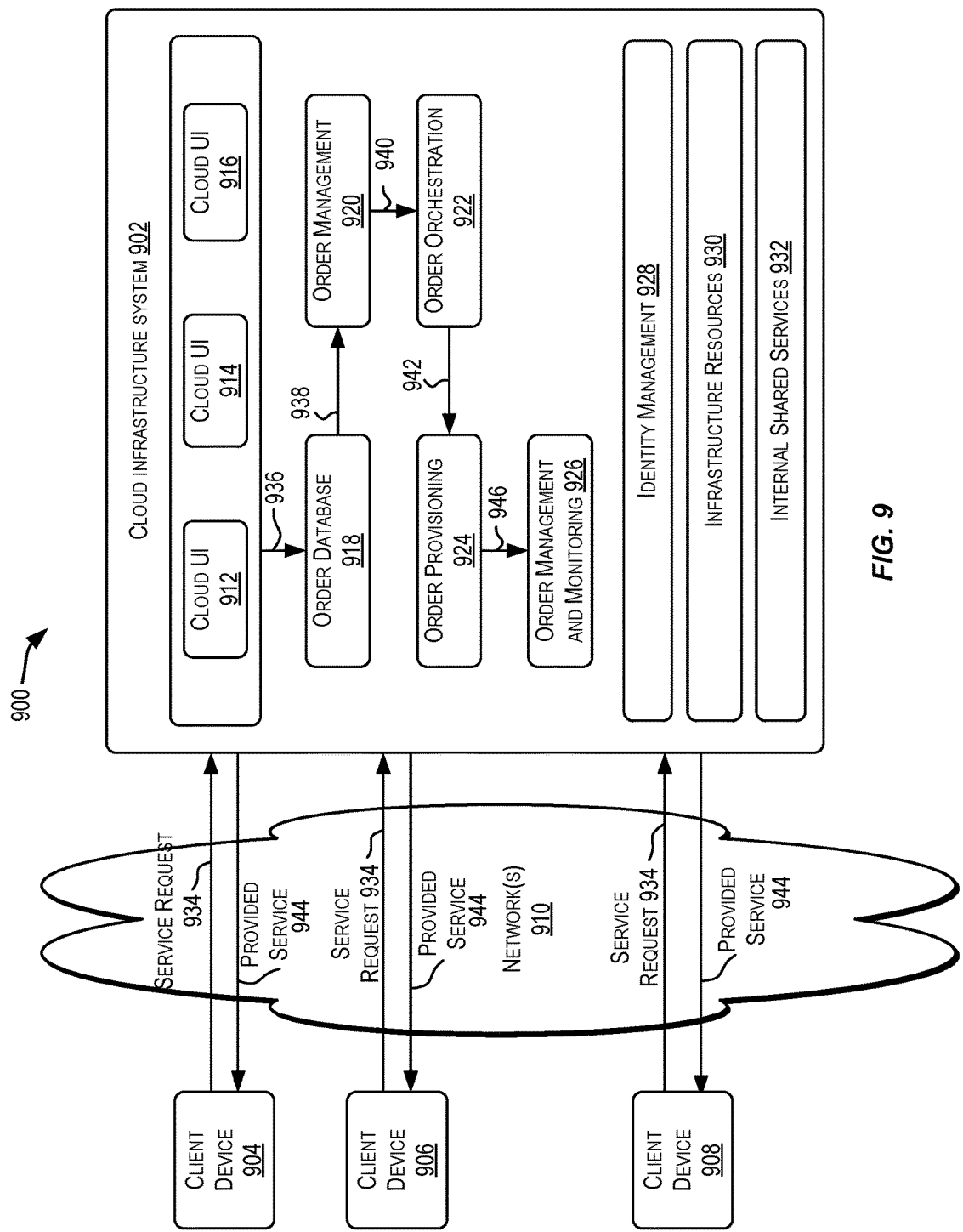
FIG. 9 is a simplified block diagram of one or more components of a system environment in which services may be offered as cloud services, in accordance with an embodiment of the present invention.

In some embodiments, the storage services and identity management services described above may be offered as services via a cloud environment, FIG. 9 is a simplified block diagram of one or more components of a system environment 900 in which services may be offered as cloud services, in accordance with an embodiment of the present disclosure. In the illustrated embodiment in FIG. 9, system environment 900 includes one or more client computing devices 904, 906, and 908 that may be used by users to interact with a cloud infrastructure system 902 that provides cloud services, including services for managing the storage of data stored in a data storage system of an organization. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle® Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

In certain embodiments, services provided by cloud infrastructure system 902 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by cloud infrastructure system can dynamically scale to meet the needs of its users.

In certain embodiments, a specific instantiation of a service provided by cloud infrastructure system 902 may be referred to herein as a "service instance" in general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data e.g., emails, images, data blobs (binary large objects), web pages, complex event processing). By leveraging an ability of an embodiment to relatively quickly focus more or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category. Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS set vices. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customers subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 924 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

FIG. 10 illustrates an exemplary computer system 1000 that may be used to implement an embodiment of the present invention. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device e.g., Google Glass®). Additionally, user interface input devices may include voice recognition sensing devices that enable users to interact with voice recognition systems e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking de vices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, the account management system 112 depicted in FIG. 1 may receive user login information including input related to a training word from client devices using communication subsystem 1024.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
receiving, from an administrative computer within a cloud services environment, a request to upgrade a cloud service application associated with a plurality of authorization policy artifacts, wherein:
upgrading the cloud service application comprises upgrading the plurality of authorization policy artifacts,
the cloud service application is provided as a service to a plurality of companies,
the plurality of authorization policy artifacts comprise customized authorization policy artifacts that are customized for at least one of the plurality of companies, and
the plurality of authorization policy artifacts comprise non-customized authorization policy artifacts that are not customized for any of the plurality of companies;
in response to receiving the request to upgrade the cloud service application, analyzing the plurality of authorization policy artifacts to identify a first subset of the plurality of authorization policy artifacts comprising the non-customized authorization policy artifacts and a second subset of the plurality of authorization policy artifacts comprising the customized authorization policy artifacts;
upgrading the first subset of the plurality of authorization policy artifacts based on the analyzing the plurality of authorization policy artifacts;
requesting input for the second subset of the plurality of authorization policy artifacts based on the analyzing the plurality of authorization policy artifacts; and
upgrading the second subset of the plurality of authorization policy artifacts based on the input.

2. The computer-implemented method of claim 1, wherein each authorization policy artifact is associated with metadata including an owner name and a modifiability flag.

3. The computer-implemented method of claim 2, wherein the modifiability flag is associated with a modification policy that defines how the authorization policy artifact is modifiable.

4. The computer-implemented method of claim 2, wherein analyzing the plurality of authorization policy artifacts further comprises:
identifying the first subset of the plurality of authorization policy artifacts and the second subset of the plurality of authorization policy artifacts based on the associated metadata.

5. The computer-implemented method of claim 1, wherein the input includes upgrade instructions for each authorization policy artifact in the second subset of the plurality of authorization policy artifacts.

6. The computer-implemented method of claim 1, wherein each authorization policy artifact in the first subset of the plurality of authorization policy artifacts is non-modifiable.

7. The computer-implemented method of claim 1, wherein analyzing the plurality of authorization policy artifacts further comprises:
identifying one or more user modifications made to the plurality of authorization policy artifacts.

8. A system comprising:
a cloud infrastructure system comprising a plurality of server computers configured to provide one or more services; and
an administrative computer, including a user interface, wherein the administrative computer is configured to send an upgrade request to the cloud infrastructure system to upgrade a cloud service application deployed in the cloud infrastructure system, wherein:
the cloud service application is associated with a plurality of authorization policy artifacts,
upgrading the cloud service application comprises upgrading the plurality of authorization policy artifacts,
the cloud service application is provided as a service to a plurality of companies,
the plurality of authorization policy artifacts comprise customized authorization policy artifacts that are customized for at least one of the plurality of companies, and the plurality of authorization policy artifacts comprise non-customized authorization policy artifacts that are not customized for any of the plurality of companies;

wherein when the upgrade request is received by the cloud infrastructure system, the cloud infrastructure system is configured to:

analyze the plurality of authorization policy artifacts to identify a first subset of the plurality of authorization policy artifacts comprising the non-customized authorization policy artifacts and a second subset of the plurality of authorization policy artifacts comprising the customized authorization policy artifacts;

upgrade the first subset of the plurality of authorization policy artifacts based on the analyzing the plurality of authorization policy artifacts;

request input for the second subset of the plurality of authorization policy artifacts based on the analyzing the plurality of authorization policy artifacts; and upgrade the second subset of the plurality of authorization policy artifacts based on the input.

9. The system of claim 8, wherein each policy artifact is associated with metadata including an owner name and a modifiability flag.

10. The system of claim 9, wherein the modifiability flag is associated with a modification policy that defines how the policy artifact is modifiable.

11. The system of claim 9, wherein analyzing the plurality of authorization policy artifacts further comprises:

identifying the first subset of the plurality of authorization policy artifacts and the second subset of the plurality of authorization policy artifacts based on the associated metadata.

12. The system of claim 8, wherein the input includes upgrade instructions for each authorization policy artifact in the second subset of the plurality of authorization policy artifacts.

13. The system of claim 8, wherein each authorization policy artifact in the first subset of the plurality of authorization policy artifacts is non-modifiable.

14. The system of claim 8, wherein analyzing the plurality of authorization policy artifacts further comprises:

identifying one or more user modifications made to the plurality of authorization policy artifacts.

15. A non-transitory computer readable storage medium including instructions stored thereon which, when executed by a processor, cause the processor to perform a method comprising:

receiving, from an administrative computer within a cloud services environment, a request to upgrade a cloud service application associated with a plurality of authorization policy artifacts, wherein:

upgrading the cloud service application comprises upgrading the plurality of authorization policy artifacts, the cloud service application is provided as a service to a plurality of companies, the plurality of authorization policy artifacts comprise customized authorization policy artifacts that are customized for at least one of the plurality of companies, and the plurality of authorization policy artifacts comprise non-customized authorization policy artifacts that are not customized for any of the plurality of companies;

in response to receiving the request to upgrade the cloud service application, analyzing the plurality of authorization policy artifacts to identify a first subset of the plurality of authorization policy artifacts comprising the non-customized authorization policy artifacts and a second subset of the plurality of authorization policy artifacts comprising the customized authorization policy artifacts;

upgrading the first subset of the plurality of authorization policy artifacts based on the analyzing the plurality of authorization policy artifacts;

requesting input for the second subset of the plurality of authorization policy artifacts based on the analyzing the plurality of authorization policy artifacts; and upgrading the second subset of the plurality of authorization policy artifacts based on the input.

16. The non-transitory computer readable storage medium of claim 15, wherein each policy artifact is associated with metadata including an owner name and a modifiability flag.

17. The non-transitory computer readable storage medium of claim 16, wherein the modifiability flag is associated with a modification policy that defines how the policy artifact is modifiable.

18. The non-transitory computer readable storage medium of claim 16, wherein analyzing the plurality of authorization policy artifacts further comprises:

identifying the first subset of the plurality of authorization policy artifacts and the second subset of the plurality of authorization policy artifacts based on the associated metadata.

19. The non-transitory computer readable storage medium of claim 15, wherein the input includes upgrade instructions for each authorization policy artifact in the second subset of the plurality of authorization policy artifacts.

20. The non-transitory computer readable storage medium of claim 15, wherein analyzing the plurality of authorization policy artifacts further comprises:

identifying one or more user modifications made to the plurality of authorization policy artifacts.

* * * * *

UNITED STATES PATENT AND TRADEMARK OFFICE
CERTIFICATE OF CORRECTION

PATENT NO. : 10,142,371 B2
APPLICATION NO. : 14/974836
DATED : November 27, 2018
INVENTOR(S) : Sastry et al.

Page 1 of 1

It is certified that error appears in the above-identified patent and that said Letters Patent is hereby corrected as shown below:

In the Specification

In Column 5, Line 62, delete "b r" and insert -- by --, therefor.

In Column 8, Line 57, delete "sources" and insert -- sources. In --, therefor.

In Column 8, Line 66, delete "WSLT" and insert -- WLST --, therefor.

In Column 10, Line 38, delete "van" and insert -- various --, therefor.

In Column 12, Line 60, delete "instance" in" and insert -- instance." In --, therefor.

In Column 13, Line 36, delete "e.g.," and insert -- (e.g., --, therefor.

In Column 13, Line 39, delete "or" and insert -- (or --, therefor.

In Column 14, Line 21, delete "set vices." and insert -- services. --, therefor.

In Column 18, Line 13, delete "e.g.," and insert -- (e.g., --, therefor.

In Column 18, Line 24, delete "de vices." and insert -- devices. --, therefor.

Signed and Sealed this
Twenty-sixth Day of November, 2019

Andrei Iancu
*Director of the United States Patent and Trademark Office*